United States Patent [19]

Turman

[11] Patent Number: 4,824,567

[45] Date of Patent: Apr. 25, 1989

[54] FUEL OIL FILTER ASSEMBLY

[75] Inventor: William C. Turman, San Juan Capistrano, Calif.

[73] Assignee: Filter Systems, Inc., Laguna Hills, Calif.

[21] Appl. No.: 152,972

[22] Filed: Feb. 8, 1988

[51] Int. Cl.⁴ .............................................. B01D 27/04
[52] U.S. Cl. .............................. 210/416.4; 210/493.4; 210/497.1; 210/DIG. 5
[58] Field of Search .............. 210/167, 232, 238, 248, 210/416.4, 416.5, 453, 497.1, DIG. 5, DIG. 7, 493.4; 55/280, 281

[56] References Cited

U.S. PATENT DOCUMENTS

| | | | |
|---|---|---|---|
| 1,783,924 | 12/1930 | McKinley | 210/493.4 |
| 2,440,680 | 5/1948 | Gerin | 196/16 |
| 2,482,302 | 9/1949 | Summers | 210/190 |
| 2,894,633 | 7/1959 | Collins | 210/341 |
| 3,167,435 | 1/1965 | Hall | 99/118 |
| 3,550,776 | 12/1970 | Hamilton | 210/416.4 |
| 3,759,388 | 9/1973 | Thomason | 210/167 |
| 3,968,741 | 7/1976 | Hunt | 99/330 |
| 4,231,768 | 11/1980 | Seibert et al. | 210/DIG. 5 |
| 4,320,005 | 3/1982 | DeGraffenreid | 210/DIG. 5 |
| 4,370,152 | 1/1983 | Luper | 55/281 |
| 4,411,791 | 10/1983 | Ward | 210/DIG. 5 |
| 4,502,955 | 3/1985 | Schaupp | 210/416.4 |
| 4,668,393 | 5/1987 | Stone | 210/497.1 |

Primary Examiner—Richard V. Fisher
Assistant Examiner—Wanda L. Millard
Attorney, Agent, or Firm—Brown, Martin, Haller & McClain

[57] ABSTRACT

An oil filter for connection in the fuel line between a fuel tank and an engine comprises an outer housing with an inlet for connection to the fuel tank and an outlet for connection in the supply line to the engine, an inner filter housing mounted in the outer housing with an open upper end for oil flow into the filter housing and an outlet at its lower end connected to the housing outlet, the filter housing containing a removable filter cartridge for filtering particles from the oil. A water collecting device is connected to the lower end of the outer housing. The filter cartridge is preferably a spirally wound roll of paper which substantially fills the inner housing.

8 Claims, 1 Drawing Sheet

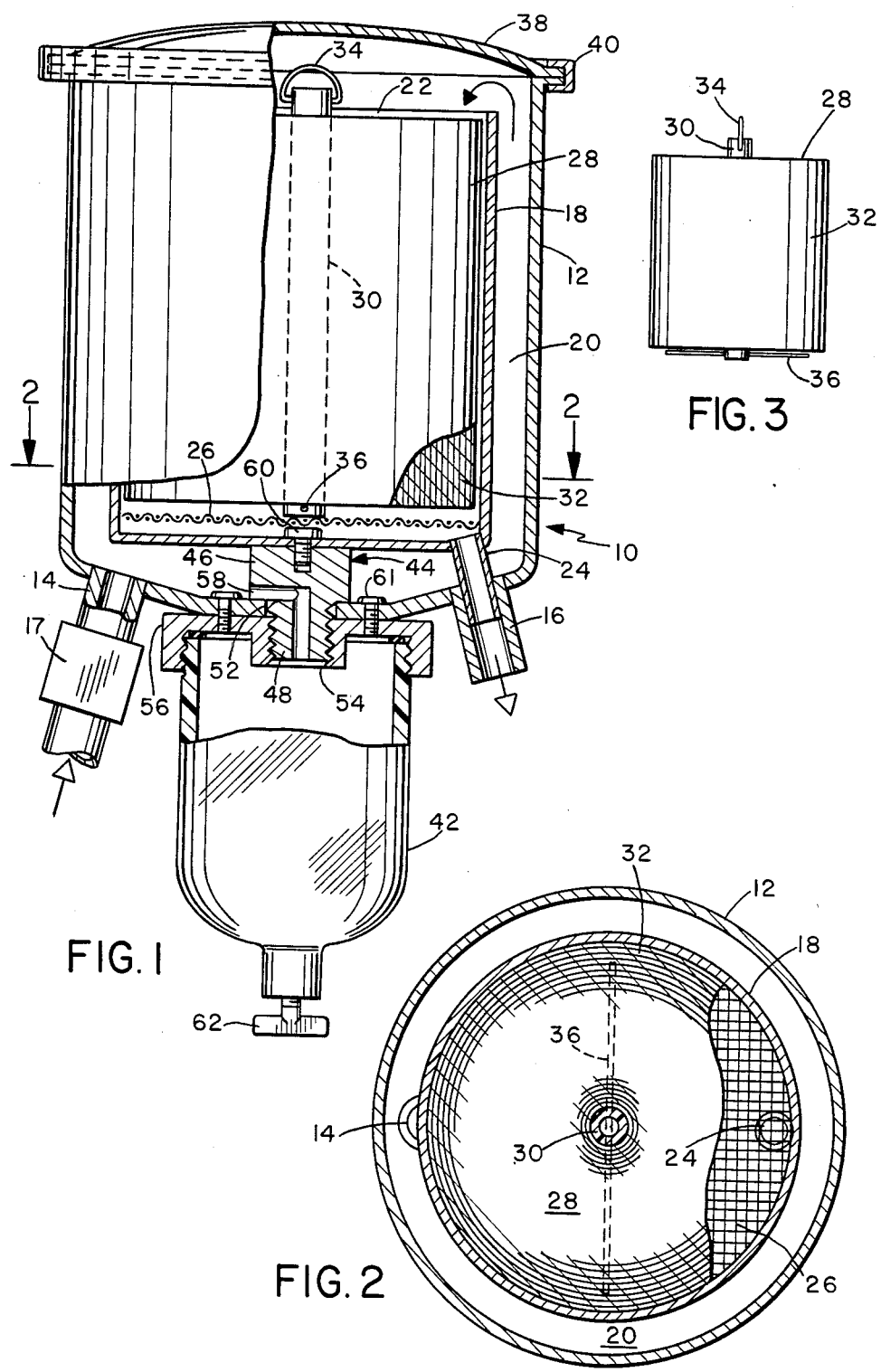

FUEL OIL FILTER ASSEMBLY

BACKGROUND OF THE INVENTION

The present invention relates generally to oil filters, and particularly to fuel oil filters for use in gasoline or diesel engines. These filters are connected in the fuel line between a fuel tank and fuel pump, for filtering particles from the fuel and for collecting water which may be present in the fuel.

Fuel oil filters generally comprise a main filter housing containing filter elements of corrugated paper or the like, and a water collecting bowl of transparent plastic at the lower end of the housing. Oil flows through the housing and bowl before leaving the housing, and any water present tends to accumulate in the collecting bowl, providing an indication of how much water is present in the fuel. The corrugated paper filtes are relatively thin and become clogged easily, making them relatively difficult and messy to change.

In my U.S. Pat. No. 3,802,564 an oil filter is described which attaches to an existing oil filter mounting on an engine. This filter comprises an outer housing with a central channel through which oil is directed to the lower end of the housing, the oil then flowing upwardly through a filter element surrounding the central channel to the outlet. The filter element may be a roll of tissue paper, pleated paper or fiber.

SUMMARY OF THE INVENTION

It is an object of the present invention to provide an improved fuel oil filter for use in conjunction with or in place of an existing filter in the fuel supply line of a gasoline or diesel engine.

According to the present invention an oil filter is provided which comprises an outer housing having an inlet for connection to the fuel tank side of a fuel supply line, and an outlet for connection to the engine side of the line, an inner, filter housing mounted in the outer housing and having an opening at its upper end for fuel to enter the inner housing and an outlet at its lower end connected to the housing outlet, the filter housing containing a removable filter cartridge for filtering particles from the oil, and a water collecting device connected to the lower end of the outer housing with an orifice allowing water to drain into the collecting device.

Preferably, the filter cartridge comprises a central dowel with a roll of filter paper spirally wound on the dowel so as to substantially fill the inner housing. The filter cartridge is freely seated in the housing so that it can be removed easily when it needs replacing. Preferably, the dowel has a handle or ring at its upper end for lifting the cartridge out of the housing. The outer housing has a removable lid at its upper end for access to the filter cartridge, and the inner housing is open at its upper end both to allow oil to flow through the housing and also to allow the filter roll to be lifted out and replaced with a new roll when necessary. The dowel has a transverse pin at its lower end extending across the lower end of the filter roll to retain it on the dowel.

The roll of paper provides a better filtering action because of the increased surface area of the filter through which the oil must flow to exit the housing. It can be removed and replaced quickly, cleanly and easily when it becomes clogged.

In use, oil will flow into the outer housing and fill the housing and water collecting bowl. Any water in the oil will tend to sink to the bottom and will be collected in the bowl. Once the filter housing is full, oil will flow into the outer housing, up to the top of the inner housing, and down through the filter roll out of the housing. Thus oil will not tend to flow through the water collecting bowl, which is connected to the lower end of the housing via a reduced diameter orifice for restricting flow. This allows water to be collected without disturbing oil flow through the filter significantly.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a side elevation view, with portions cut away, showing an oil filter assembly according to a preferred embodiment of the present invention;

FIG. 2 is a sectional view taken on the line 2—2 of FIG. 1; and

FIG. 3 is a side elevation view, on a reduced scale, of a filter cartridge used in the assembly of FIG. 1.

DESCRIPTION OF THE PREFERRED EMBODIMENT

FIG. 1 of the drawings shows an oil filter assembly 10 according to a preferred embodiment of the present invention which is designed to be connected in the fuel line of a vehicle engine between the fuel tank and the engine. The assembly is suitable for use in filtering gasoline or diesel oil.

As shown in FIGS. 1 and 2, the assembly basically comprises an outer cylindrical housing 12 having an inlet 14 at its lower end for connection to the fuel tank of an engine via a suitable connecting line, and an outlet 16 also at the lower end for connection to the fuel pump via a suitable connecting line in a standard fashion. A suitable check valve 17 is provided at the inlet 14 to prevent backflow of dirty oil when the engine is idle.

An inner, cylindrical filter housing 18 is mounted in the outer housing with an annular space 20 between the inner and outer housings. The inner housing has an open upper end 22 and an outlet 24 at its lower end connected to the outer housing outlet 16. A mesh filter screen 26 is seated at the lower end of housing 18, and a removable filtering device or cartridge 28 rests on the screen.

The filtering device or cartridge 28 in the preferred embodiment of the invention comprises a central dowel or pin 30 with a roll 32 of filter paper spirally wound on the dowel. The dowel projects out from opposite ends of the roll, and a handle or ring 34 is provided at one projecting end while a transverse retaining pin 36 extends through the opposite end and across the end of the roll of paper to retain it on the dowel, as best shown in FIG. 3. The ring 34 allows the cartridge to be lifted out of the filter housing easily for replacement by a new cartridge. The filter roll is similar to that described in my co-pending patent application Ser. No. 135,597, filed Dec. 21, 1987, and entitled "Cooking Oil Filtering System and Method". It is preferably at least 4.5 inches in length, and has a diameter sufficient to substantially fill the inner filter housing.

The upper end of the outer housing is closed by a removable cover or lid 38 which is releasably secured to the housing by any suitable means, such as clamp ring 40 illustrated in FIG. 1. This allows the housing to be opened for removal of a filter cartridge in the inner housing.

A water collecting bowl 42 is removably connected to the lower end of the outer housing to collect any water in the oil passing through the filter. A releasable securing assembly 44 connects the lower ends of the inner and outer housings and the upper end of the collecting bowl together. The assembly 44 basically comprises a spacer or boss 46 which spaces the lower end of the inner housing above the lower end of the outer housing, the boss having a screw threaded lower end or shaft 48 which extends through aligned central openings 52, 54, respectively, in the lower end of the outer housing and a removable upper end cover 56 of the bowl 42. The lower end of the boss and the opening 54 of the bowl cover have corresponding screw threaded formations for releasably securing the bowl to the boss. The lower end of the out housing 10 is also secured to the upper end of the bowl cover 56 via screws 61. The boss has a connecting orifice or drainage hole 58 which connects the space below the inner housing to the bowl 42 to allow water drainage. As seen in FIG. 1, the inner housing is also secured to the upper end of the boss 46 via screw 60. The bowl is preferably of transparent plastic to act as an indicator for water content, and includes a stop cock 62 at its lower end for draining water when the bowl is full.

Thus, the bowl can be easily separated when necessary for cleaning, simply by unscrewing bowl 42 from the lower end of bowl cover 56.

In use oil flows through the filter assembly in the direction of the arrows in FIG. 1. Thus, oil enters through inlet 14, flows upwardly through the space between the inner and outer housings, and down through the open upper end of the inner housing through filter cartridge and out through outlet 16. The rolled paper filter cartridge provides better filtering than standard corrugated paper filters, since it is much longer and more dense than flat or corrugated sheets of paper. It is also much easier to remove and replace when clogged.

Any water in the oil will tend to collect in the water bowl at the lower end of the housing. Because of the small diameter orifice, the oil does not flow through this bowl once the filter housing and bowl are full, but instead flows through the outer and inner housings in the direction of the arrows in FIG. 1. The heavier water will tend to sink to the bottom of the housing and leak through the orifice into the bowl, displacing any oil present in the bowl. Thus, the user can see how much water is present in the fuel.

Although a preferred embodiment of the invention has been described above by way of example only, it will be understood by those skilled in the field that modifications may be made to the disclosed invention without departing from the scope of the invention, which is defined by the appended claims.

I claim:

1. An oil filter assembly, comprising:
   an outer housing having upper and lower ends, an inlet for connection to a supply line from a fuel tank and an outlet for connection to the supply line to an engine;
   an inner, filter housing mounted in the outer housing having an open upper end, an outlet at its lower end connected to the outer housing outlet, and an imperforate cylindrical wall extending between the upper and lower ends for directing oil to flow upwardly between the inner and outer housings and downwardly through the open upper end of the inner housing towards the outlet;
   a removable filter cartridge removably mounted in the inner housing for filtering particles from the oil; and
   a water collecting device connected to the lower end of the outer housing.

2. The filter assembly as claimed in claim 1, wherein the outer housing has a reduced diameter orifice at its lower end connected to the water collecting device.

3. The filter assembly as claimed in claim 1, wherein the filter cartridge comprises an imperforate dowel with a roll of filter paper spirally wound on the dowel substantially filling the inner housing.

4. The filter assembly as claimed in claim 3, wherein the dowel has handle means at its upper end for lifting the filter cartridge out of the housing.

5. The filter assembly as claimed in claim 3, including a retaining pin projecting transversely through a lower end of the dowel across the end of the filter roll to retain it on the dowel, the filter cartridge resting freely in the inner housing.

6. The filter assembly as claimed in claim 3, further including a flat mesh filter element seated at the lower end of the filter housing, the filter cartridge being seated on top of the mesh filter element.

7. The filter assembly as claimed in claim 1, including releasable securing means extending through the lower ends of the inner and outer housings and the upper end of the water collecting device to releasably secure them together, the securing means having spacer means for spacing the lower end of the inner housing above the lower end of the outer housing, the spacer means having an orifice which extends through the securing means into the collecting device to allow water to leak from the outer housing into the collecting device.

8. A filter cartridge for use in a fuel oil filter assembly, the cartridge comprising an imperforate dowel and a roll of filter paper spirally wound on the dowel, the dowel projecting from opposite ends of the roll and having handle means at one projecting end for carrying the cartridge, and a transverse retaining pin extending through the opposite end of the dowel and across the end of the roll to retain it on the dowel.

* * * * *